July 4, 1967  B. J. WELSCH ETAL  3,329,034
VARIABLE SPEED TRANSMISSION
Filed April 20, 1965
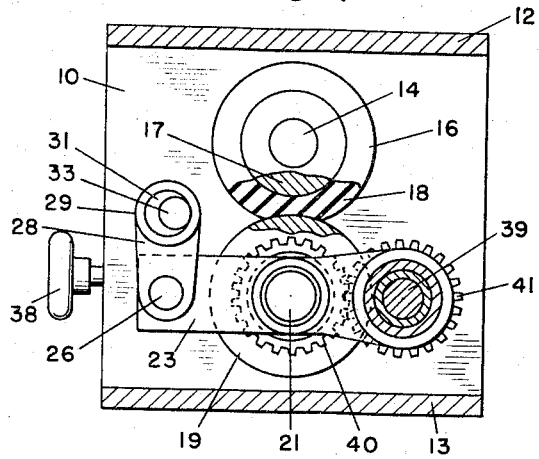
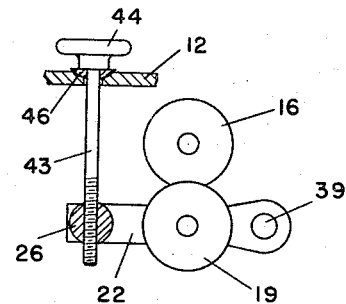
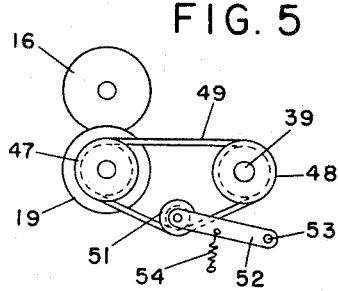
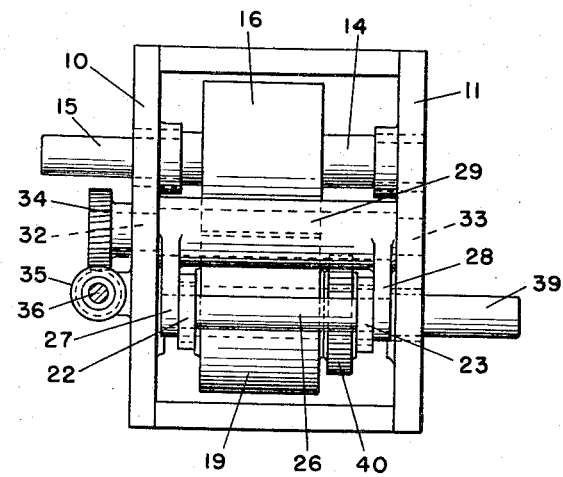
INVENTORS
BERNHARD J. WELSCH
GERHARD A. NOTHMANN
BY
Hume Groen Clement & Hume
ATTORNEYS

United States Patent Office 3,329,034
Patented July 4, 1967

3,329,034
VARIABLE SPEED TRANSMISSION
Bernhard J. Welsch, Downey, Calif., and Gerhard A. Nothmann, Wilmette, Ill., assignors to Miehle-Goss-Dexter, Incorporated, Chicago, Ill., a corporation of Delaware
Filed Apr. 20, 1965, Ser. No. 449,480
8 Claims. (Cl. 74—190)

ABSTRACT OF THE DISCLOSURE

The variable speed transmission has a drive roller having a surface of relatively resilient, deformable, but essentially incompressible material and a driven roller having a surface of hard, non-yielding material. One of the rollers is mounted for bodily adjustment relative to the other roller so that the center distance between the rollers and thereby the extent of local deformation of the resilient material can be adjusted to thereby vary the speed of the driven roller relative to the drive roller.

---

This invention relates to variable speed drive mechanisms. It is directed more specifically to an improved variable speed drive mechanism for effecting infinitely variable speed changes within a relatively narrow range.

Heretofore, infinitely variable speed drive mechanisms have usually incorporated means such as belts which are tracked about variable diameter sheaves or else they have means incorporated therein for shifting a friction driven element relative to a disc or cone shaped drive member. While the known drives have proved to be effective for the purpose, nevertheless they are relatively complicated and expensive, and it is an object of the present invention to provide a new and improved variable speed drive, which represents a radical departure from the known mechanisms; which is of relatively simple and economical construction, and which utilizes the elastic flow characteristics of resilient deformable materials to effectively vary the speed of a driven member.

In its simplest form the invention comprises a drive roller mounted for rotation about a fixed axis and which has a covering of an elastomer material, such as rubber or the like. The drive roller is adapted to have rolling contact with a hard, non-yielding driven roller that is mounted for adjustment whereby to vary the center distance between said rollers to thereby vary the extent of local deformation of the resilient elastomer covered roller, and means are provided to transmit the variable motion of the driven roller to an output shaft which, preferably, is mounted for rotation about a fixed axis.

Another object of the invention is to provide a drive mechanism capable of adjustment for carrying the speed of the driven member while the driving member rotates at a constant speed and wherein the speed adjustment is effected by varying the contact pressure of a roller of metal or the like having a hard non-resilient surface with a roller having a surface of elastomer material and which is resilient and deformable.

The features and advantages of the invention will be more clearly understood from the following description and the accompanying drawings wherein;

FIGURE 1 is a side elevational view, partly in section and illustrating a drive mechanism constructed in accordance with this invention;

FIGURE 2 is an end elevational view looking from the left to right in FIGURE 1;

FIGURE 3 is a top plan view of FIGURE 1, partly in section and illustrates the mounting arrangement of the various elements;

FIGURE 4 is a schematic view illustrating a modification of the adjusting means, and;

FIGURE 5 is a schematic view illustrating a modification of the means for transmitting the motion of the driven roller to the output shaft.

In the drawings the drive mechanism is illustrated as comprising a frame or housing consisting of the side walls 10 and 11 which are connected by the top wall 12 and bottom wall 13. A power input shaft 14 is suitably journalled for rotation about a fixed axis in the respective side walls and one end 15 thereof projects beyond the wall 10 whereby rotary motion is imparted to said shaft from a convenient source of power. A drive roller 16 is secured to the shaft 14 and it consists of a solid core 17 on which is mounted a cylindrical covering or body 18 of resilient, deformable elastomer material, such as rubber or the like having a relatively high coefficient of friction.

A roller 19 which is formed of steel or any other suitable non-yielding material, is adapted to be driven through surface contact with the drive roller 16 and said roller 19 is mounted on a shaft 21 that is journalled for rotation in the spaced arms 22 and 23, FIGURE 2, which are pivotally mounted on the respective bosses 24 and 25, FIGURE 3, provided on the side walls 10 and 11.

The arms 22 and 23 are arranged to be adjustable about their pivot axis to thereby vary the center distance between the drive roller 16 and the driven roller 19 and for this purpose the free ends of said arms are mounted on a shaft 26 which is supported in the depending arms 27 and 28 of a yoke member 29 that is mounted on a cross shaft 31 having eccentric journals 32 and 33 which are rotatably mounted in the respective side walls 10 and 11.

Journal 32 projects beyond the side wall 10 and is provided with a worm gear 34 which meshes with a worm 35, the latter being secured to a shaft 36 journalled for rotation in the brackets 37 on the side wall 10 and which is equipped with a handwheel 38 by means of which the shaft and worm can be rotated.

It will be evident that upon rotation of the worm 35, rotary motion will be imparted to the cross shaft 31 through the worm gear 34 and due to the eccentricity of the journals 32 and 33, the yoke member 29 and thus the arms 22 and 23 will be raised or lowered depending upon the direction of rotation of the handwheel 38. Motion of the arms 22 and 23 will in turn raise or lower the roller 19 relative to the roller 16 which will vary the extent of deformation of the resilient covering material on the roller 16 and thereby effect a change in speed of the roller 19 relative to the roller 16. The change in speed results from the variation in the extent of deformation of the resilient material which produces a change in the effective perimeter or radius of the roller 16. The greater the deformation the larger the effective radius of the roller 16 and vice versa.

Rotary motion of the driven roller 19 is transmitted to the output shaft 39 by means of the gears 40 and 41, gear 40 being secured to the shaft 21 for rotation and movement therewith when adjustments are imparted to the driven roller 19. Gear 41 is secured to the output shaft 39 which is jorunalled for rotation in the side walls about a fixed axis which is coincident with the pivot axis of the arms 22 and 23. Accordingly, adjustments imparted to the roller 19 will not affect the meshing relation of the gears 40 and 41.

As shown in the drawings, the rollers 16 and 19 are of such diameter and the center distance between said rollers, with the adjustable eccentric in its neutral position, is such that the output shaft 39 will rotate at a predetermined basic speed with respect to the input shaft 14. Thus by appropriate adjustment of the eccentric shaft 31 the speed of the output shaft can either be increased or decreased relative to the basic speed within the range of the drive.

The range of speed variation is, of course, dependent upon two factors. It will be appreciated that the low limit of adjustment is dependent upon the amount of torque desired in the output shaft of a given drive mechanism and thus the pressure between the hard and resilient surfaced rollers must remain such as to produce the friction necessary to transmit the required torque.

The upper limit on the other hand is dependent primarily upon the characteristics of the resilient material and the extent to which it can be deformed and still operate for extended periods without deteriorating under constant flexing.

It will be obvious, however, that the diameters of the drive and driven rollers can be varied to either step up or step down the basic speed as desired and the adjustability of the rollers can then be utilized for varying the basic output speed.

Moreover, while the description has been directed to the use of eccentric means for effecting speed adjustments it will be appreciated that this function can be accomplished in other ways. For example, FIGURE 4 illustrates a modification wherein the adjustment of the roller 19 may be effected by means of a screw or bolt 43 which is inserted through an opening in the top wall 12 with its depending end threaded into the cross shaft 26. By turning the knob 44, the arms 22 and 23 and therewith the roller 19 can readily be adjusted relative to the roller 16 and the bolt 43 is preferably seated on a curved washer such as 46 to permit a slight shifting of the bolt as the arms pivot about the axis of the output shaft 39.

It will also be evident that the device is not limited to the use of gears to transmit the motion of roller 19 to the output shaft 39. FIGURE 5 illustrates a further modification wherein the output shaft is spaced from the roller 19 and the gears 40 and 41 are replaced by sheaves 47 and 48. A V-belt 49 is tracked about the sheaves to thereby drive the output shaft 39 and uniform belt tension is maintained by an idler pulley 51 which is mounted on the lever 52 pivoted at 53. A spring 54 urges the pulley in counterclockwise direction to maintain the desired tension on the V-belt for all adjusted positions of the roller 19.

It will also be apparent that the input and output shafts, as described in each of the modifications may be interchanged in their functions and serve as output and input shafts respectively. For example, referring again to FIGURE 1, if the shaft 39 is the power input shaft, then the shaft 21 can be considered as an intermediate shaft carrying the hard surfaced drive roller 19. Also, in this reversal of the driving instrumentality, the shaft 14 will become the output shaft with the same carrying the driven rollers 16 having a surface provided by the resilient deformable material 18.

It is evident, therefore, that various other modifications and changes will be apparent to persons skilled in the art without departing from the spirit of this invention or the scope of the appended claims.

What is claimed is:

1. A variable speed transmission comprising, a power input shaft, a drive roller mounted on said shaft, an output shaft spaced from said input shaft, a driven roller mounted for rotation and adapted to engage the periphery of said drive roller, one of said rollers being formed of hard, non-yielding material and the other roller being formed of resilient, deformable material, means mounting said driven roller for bodily movement about the axis of said output shaft relative to said drive roller to thereby vary the extent of local deformation of said resilient material, and means for transmitting the rotary motion of the driven roller to the output shaft.

2. A device as set forth in claim 1 wherein the means for transmitting the rotary motion of the driven roller to the output shaft comprises a first gear mounted for rotation with said driven roller and a second gear mounted for rotation about the axis of the output shaft.

3. A device as claimed in claim 1, additionally including means for bodily moving the driven roller for adjusting the driven roller relatve to the drive roller, said means including a shaft having eccentric journals.

4. A variable speed transmission comprising a power input shaft journalled for rotation about a fixed axis, an output shaft journalled for rotation about a fixed axis spaced from said input shaft, a drive roller mounted on said input shaft and having a surface of resilient deformable material, a driven roller adapted to have rolling contact with the surface of said drive roller, said driven roller having a hard non-yielding surface, means journalling said driven roller for rotation including a pair of spaced arms mounted for pivotal movement about the axis of the output shaft, adjustable means connected to said arms for maintaining the driven roller at a predetermined center distance with respect to the drive roller, whereby said driven roller exerts a predetermined pressure on the drive roller, means for adjusting said adjustable means to thereby vary the pressure between the drive and driven rollers and thus the extent of local deformation of the resilient surface of said drive roller, and means for transmitting the rotary motion of the driven roller to the output shaft.

5. A variable speed transmission comprising a power input shaft, an intermediate shaft, means coupling said input shaft to said intermediate shaft for imparting rotary motion thereto, a drive roller mounted on the intermediate shaft for rotation therewith, an output shaft, a driven roller mounted on said output shaft for rotation therewith and adapted to engage the periphery of said drive roller, one of said rollers being formed of hard, non-yielding material and the other roller being formed of resilient, deformable material, and means mounting said intermediate shaft and therewith said drive roller for bodily movement about the axis of said power imput shaft relative to said driven roller to thereby vary the extent of local deformation of said resilient material and whereby the speed of said driven roller is varied with respect to the speed of said drive roller.

6. A variable speed transmission comprising a power input shaft, a cylindrical drive member mounted for rotation with said input shaft, an output shaft spaced form said input shaft, a cylindrical driven member mounted for rotation and frictional engagement with said cylindrical drive member, one of said members having a surface of hard, non-yielding material and the other member having a coacting surface of resilient, deformable material, means mounting the cylindrical driven member for bodily movement relative to the cylindrical drive member about the axis of said output shaft, means for adjusting said mounting means to thereby vary the extent of local deformation of said resilient material whereby the speed of said driven member is varied relative to said drive member, and means for transmitting the rotary motion of said driven member to the output shaft.

7. A variable speed transmission comprising a power input shaft, a drive member mounted for rotation with said input shaft and having a surface formed of relatively resilient, deformable, but essentially incompressible material, a driven member mounted for rotation and frictional engagement with the said surface of the drive member, said driven member having a coacting surface formed of hard, non-yielding material, means mounting one of said members for bodily adjustment relative to the other member to thereby vary the pressure between the coacting surfaces and thus the extent of local deformation of the resilient material, an increase in the extent of local deformation of said resilient material producing an increase in the speed of the driven member relative to the drive member and a decrease in the extent of local deformation of said resilient material producing a decrease in the speed of the driven member relative to the drive member, an output shaft spaced from said input shaft, and means for transmitting the rotary motion of the driven member to the output shaft.

8. Apparatus as set forth in claim 7 wherein the drive member has a surface formed of hard, non-yielding material and the driven member has a surface formed of relatively resilient, deformable, but essentially incompressible material, whereby an increase in the extent of local deformation of the resilient material produces a decrease in the speed of the driven member relative to the drive member and a decrease in the extent of local deformation of the resilient material produces an increase in the speed of said driven member relative to said drive member.

References Cited

UNITED STATES PATENTS

| 2,308,090 | 1/1943 | MacFarren | 74—190 |
| 3,020,782 | 2/1962 | Sacchi | 74—190 X |

DONLEY J. STOCKING, *Primary Examiner.*

MARK NEWMAN, *Examiner.*

L. H. GERIN, *Assistant Examiner.*